United States Patent
Blondeau

(10) Patent No.: US 7,188,428 B2
(45) Date of Patent: Mar. 13, 2007

(54) THERMALLY COMPENSATED TEST PIECE FOR COORDINATE MEASURING MACHINES

(75) Inventor: Jean Blondeau, Sinshelm-Dühren (DE)

(73) Assignee: Metronom AG, Mainz (DE)

( * ) Notice: Subject to any disclaimer, the term of this patent is extended or adjusted under 35 U.S.C. 154(b) by 4 days.

(21) Appl. No.: 10/505,345

(22) PCT Filed: Feb. 14, 2003

(86) PCT No.: PCT/EP03/01508

§ 371 (c)(1),
(2), (4) Date: May 16, 2005

(87) PCT Pub. No.: WO03/071225

PCT Pub. Date: Aug. 28, 2003

(65) Prior Publication Data

US 2005/0252017 A1    Nov. 17, 2005

(30) Foreign Application Priority Data

Feb. 20, 2002    (EP) .................................. 02003852

(51) Int. Cl.
*G01B 5/00* (2006.01)
*G01B 3/30* (2006.01)
(52) U.S. Cl. ......................................... 33/502; 73/1.79
(58) Field of Classification Search .................. 33/502, 33/567, 704, 559, 560; 73/1.79
See application file for complete search history.

(56) References Cited

U.S. PATENT DOCUMENTS

| | | | | |
|---|---|---|---|---|
| 4,435,905 A | * | 3/1984 | Bryan | 33/613 |
| 4,492,036 A | * | 1/1985 | Beckwith, Jr. | 33/613 |
| 4,932,136 A | | 6/1990 | Schmitz et al. | |
| 5,016,474 A | * | 5/1991 | Hazony et al. | 73/597 |
| 5,164,722 A | * | 11/1992 | Laroze et al. | 73/1.88 |
| 5,681,981 A | * | 10/1997 | McMurtry | 33/502 |
| 5,813,287 A | * | 9/1998 | McMurtry et al. | 901/22 |
| 6,023,850 A | * | 2/2000 | Trapet | 33/502 |
| 6,243,527 B1 | | 6/2001 | Dawson-Elli | |
| 6,505,495 B1 | | 1/2003 | Blondeau | |
| 6,681,495 B2 | * | 1/2004 | Masayuki et al. | 33/502 |
| 6,772,619 B2 | * | 8/2004 | Nashiki et al. | 73/1.79 |
| 6,836,323 B2 | * | 12/2004 | Schmadel | 33/502 |
| 6,886,264 B2 | * | 5/2005 | Sakata et al. | 33/502 |
| 2004/0036867 A1 | | 2/2004 | Jedamzik et al. | |

* cited by examiner

*Primary Examiner*—G. Bradley Bennett
(74) *Attorney, Agent, or Firm*—IP Strategies

(57) ABSTRACT

Test piece, comprising at least two shaped probe elements and at least one connecting element for connecting the at least two shaped probe elements. Each connecting element is provided with at least one fastening element at one end of the connecting element for fastening a shaped probe element. Length variations of the at least two shaped probe elements and/or of the at least one connecting element are compensated by the fastening elements in such a way that the distance between respective two sensing points under standard measuring conditions is essentially constant.

20 Claims, 3 Drawing Sheets

THERMALLY COMPENSATED TEST PIECE FOR COORDINATE MEASURING MACHINES

FIELD OF THE INVENTION

The invention relates to a test piece with at least two shaped probe elements and with at least one connecting element for connecting the at least two shaped probe elements, wherein each connecting element is provided with at least one fastening element for fastening a shaped probe element to an end of the connecting element.

BACKGROUND OF THE INVENTION

Such a test piece is known from DE 199 15 012.

Test pieces serve in general for the adjustment and the surveillance of specially positioning and measuring systems, in particular of mobile coordinate measuring systems. They customary consist of reference elements, so called shaped probe elements, which are connected by connecting elements and which have accurately defined distances from each other. A coordinate measuring system is checked by determining the relative positions of the shaped probe elements. The relative positions obtained in that way are compared with the actual distances of the test piece.

Test pieces should fulfill various requirements. At the one hand the properties of a test piece under standard measuring conditions, i.e. at temperatures between −20° Celsius and +70° Celsius and a humidity between 0% and 100%, should not or just insignificantly vary. In particular, this means that the relative positions of the shaped probe elements should not vary significantly with changes in temperature or in humidity under standard measuring conditions. At the other hand a test piece should be transportable with economically justifiable effort, so that is suitable for the surveillance of mobile devices. Therefore, a test piece should not show a high self-weight and should be easily mountable and demountable.

The test piece described in DE 199 15 012 comprises ball-shaped probe elements and rod-shaped connecting elements. The shaped probe elements and the connecting elements altogether form a tetrahedron, at the corners of which the shaped probe elements are arranged. The material and/or the dimensioning of the shaped probe elements and the material and/or the dimensioning of the connecting elements are matched to each other in such a way, that the distance between two respective sensing points essentially does not change under standard measuring conditions. This is achieved thereby, that the shaped probe elements comprise a material with a positive or a negative length expansion coefficient and the connecting elements comprise a material with a negative or a positive length expansion coefficient, respectively, under standard measuring conditions, such that the respective length contractions or length dilations are compensated. The connecting elements consist for example of carbon fibre composite material or glass-ceramic material.

A further test piece is known from EP 0 350 532. Therein, the connecting elements consist of a fibre composite material, in which layer of circumferential windings and cross windings alternate, wherein the cross windings are wound with one fibre, that has negative thermal expansion coefficient. Whereas the balls consist of a material which has a positive thermal expansion coefficient.

A first disadvantage of the mentioned prior art is, that the material and/or the dimensioning of the complete connecting elements have to be chosen such that the expansions or contractions of the shaped probe elements are compensated. Thus, one is strongly restricted in the choices of the material and in particular in the dimensioning of the connecting elements. A further disadvantage is that special materials with negative thermal expansion coefficients are generally more expensive to produce, from which a high price of the test element results.

The problem underlying the invention is therefore to overcome said disadvantages and to provide a test piece, which is particularly suited to accurately check mobile coordinate measuring machines, but in which the material and/or the dimensioning of the connecting elements do not have to be chosen primarily in dependence of the material and/or the dimensioning of the shaped probe elements.

BRIEF SUMMARY OF THE INVENTION

This problem is solved by a test piece as described. Accordingly the inventive test piece comprises at least two shaped probe elements and at least one connecting element for connecting the at least two shaped probe elements, wherein each connecting element is provided with at least one fastening element at one end of the connecting element for fastening a shaped probe element, characterised in that length variations of the at least two shaped probe elements and/or of the at least one connecting element are compensated by the fastening elements in such a way that the distance between respective two sensing points under standard measuring conditions is essentially constant.

The advantage of such a test piece is that the length variations of the shaped probe elements and/or the connecting elements is compensated by the fastening elements. Thus in particular a high accuracy in the checking of coordinate measuring machines is obtained. Furthermore, the material and/or the dimensioning of the shaped probe elements and the connecting elements can largely be chosen free. If an expensive material with a negative thermal expansion coefficient is chosen, the required amount of material is considerably less as if the complete connecting element would have to be made thereof. Therefore, the inventive test piece results in a substantially higher flexibility for the choices of the materials and/or the dimensioning; additionally the production costs can be reduced.

Preferably each fastening element of an inventive test piece comprises a material with a positive or negative thermal length expansion coefficient and the form and/or the dimensioning of the fastening elements are chosen such that the length variations of each shaped probe element and/or of each connecting element is compensated under standard measuring conditions.

Therefore, if for example the shaped probe elements and the connecting elements have a positive thermal length expansion coefficient also each fastening element can comprise a material with a positive length expansion coefficient. The form and/or the dimensioning of the fastening elements can then be chosen such that for a positive temperature variation under standard measuring conditions the length dilations of the shaped probe elements and/or of the connecting elements are compensated. In this case the usage of expensive materials with negative thermal expansion coefficient can be omitted.

According to an advantageous development of the afore described test piece, each fastening element comprises a first sectional element of a first material and a second sectional element of a second material, wherein each fastening element is arranged at the connecting element and the form and/or the dimensioning of the two sectional elements is chosen such that length variations of each shaped probe element and/or of each connecting element are compensated under standard measuring conditions.

In this advantageous way it is possible to compensate length variations of shaped probe elements and/or connecting elements with positive thermal expansion coefficient by fastening elements that comprise a material with a positive thermal expansion coefficient.

According to an advantageous development the first sectional element is designed as a hollow body, in particular in form of a sleeve. Thereby a simple mechanism for the compensation of the length variations of the connecting elements and the shaped probe elements can be obtained. The fastening element for example can be arranged on the connecting element or within the connecting elements or around the connecting elements.

Preferably the connecting elements of a test piece are formed as rods. Thus a control of the length variations is possible in a simple manner. Furthermore, in this case already a comparably rough positioning of the connecting elements leads to relatively accurate positions of the shaped probe elements with respect to each other.

Preferably the fastening elements are connected to the connecting elements such that on the one hand an exact and fixed positioning can be achieved and on the other hand excessive tensions or disruption effects in the materials during length dilations or contractions are avoided. The connection can achieved for example by adhesive bonding or hard soldering.

Advantageously the shaped probe elements are designed ball-shaped. The centers or the centers of gravity of the shaped probe elements, in this case balls, can be advantageously lie on the extensions of the axes of the rod-shaped connecting elements. The centers of the balls can represent the sensing points. In this way the relative positions of the shaped probe elements, respectively the sensing points, can be established with high precision.

According to an advantageous development the sections of the fastening elements, in particular the end faces, on which the shaped probe elements are arranged, can be designed conical, preferably adapted to the radius of the ball-shaped probe elements.

This leads to a further improvement in the accuracy of the positioning of the shaped probe elements with respect to the fastening and connecting elements.

It is an advantage if the shaped probe elements and the fastening elements are detachable connectable to each other. According to a preferred embodiment the detachable connection is realised by magnetic forces. Thereby a mechanism is provided, which allows a particularly easy mounting and demounting of the test piece and thus a simplified transport of the test piece to its place of installation is enabled.

For the formation of the magnetic connections the fastening elements can comprise magnets. These can for example be adhesively bonded to the fastening element or be arranged by soldering. In this development the shaped probe elements may be made up of magnetic material or may also be provided with magnets.

According to an advantageous development of all test pieces described before at least one shaped probe element is connected with at least two connecting elements. In this manner test pieces with different geometries can be obtained. A possible example is a test piece made up of three shaped probe elements, three fastening elements and two connecting elements, in which the shaped probe elements lie along one axes and each of the outer shaped probe elements is connected with the inner shaped probe element via a connecting element.

According to an advantageous development of this test piece the connecting elements form the edges and the shaped probe elements form the corners of a tetrahedron, as shown in FIG. 3. Such a test piece geometry permits a simple positioning. Furthermore, due to the tetrahedron form all shaped probe elements are accessible with just a single sensing pin.

BRIEF DESCRIPTION OF THE DRAWINGS

Further advantages follow from the following description of special embodiments of the invention and with reference to the drawings. In the drawings.

DETAILED DESCRIPTION OF THE INVENTION

Figure 1:
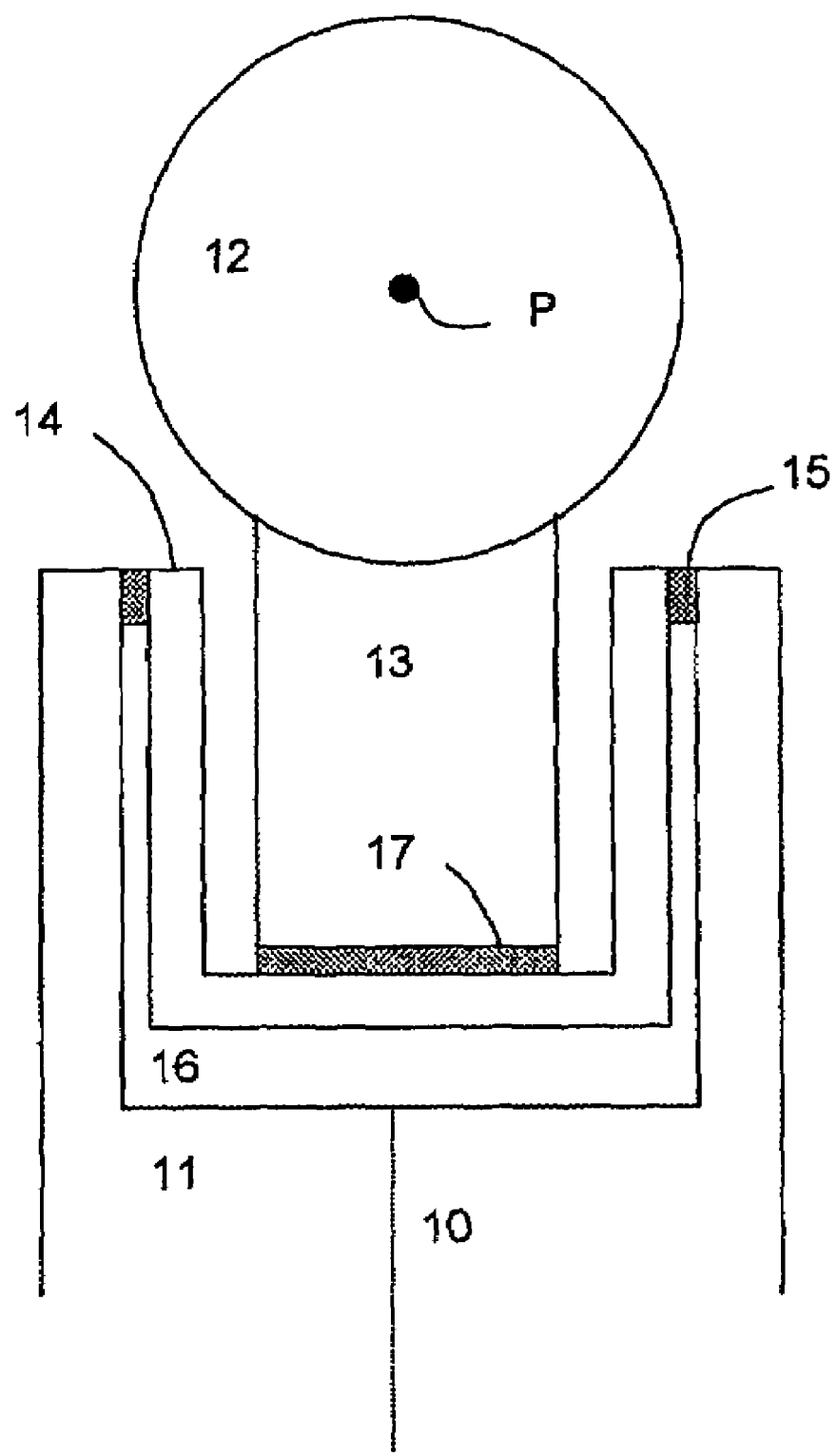
FIG. 1 shows a cross sectional view (not to scale) of a first embodiment of an inventive fastening element with a connecting element and a shaped probe element.

FIG. 1 shows a fastening element which is embedded in the connecting element 11. For this purpose the end of the connecting element 11 has been hollowed out, such that a cavity 16 is formed. Alternatively the complete connecting element can be hollow. The fastening element comprises a hollow body in the form of a sleeve 14, as a first sectional element, which at the upper rim is adhesively bonded at a location 15 to the inside of the connecting element 11. This connection can be arranged either only at several punctual locations or for example around the complete sleeve in a narrow region at the upper rim. The less the adhesively bonded area is, the less tensions occur during contractions and dilations. Within the sleeve 14 is a second sectional element 13, on which the ball-shaped probe element 12 with sensing point P is arranged. At its base the sectional element 13 is adhesively bonded to the bottom of the sleeve. This can be effected via the layer 17 or only at single points. The sectional element 13 can also additionally or instead be connected with other locations and via other connection devices with the sleeve 14. Preferably the sectional element 13 is a magnet and the shaped probe element 12 comprises a magnetic material. In this case the shaped probe element 12 is in a simple manner detachably connected with the fastening element, which in this embodiment comprises the sectional elements 13 and 14. In this embodiment the connecting element 11, the shaped probe element 12, the magnet 13 as well as the sleeve-shaped sectional element 14 have a positive thermal length expansion coefficient. During a positive variation in temperature all of the materials undergo a length dilation. Thereby the sleeve-shaped sectional element 14 indeed expands along the rod axis 10 into the connecting element 11. If the dimensioning of the sleeve-shaped sectional element 14 is suitably chosen, the expansion of the remaining elements can be compensated, such that the distance between two sensing points stays essentially constant. This compensating mechanism is functioning for different combinations of thermal expansion coefficients. Thus, for example the magnet 13 may have a vanishing expansion coefficient, the shaped probe element 12 may have a positive and the connecting element 11 may have a negative expansion coefficient, but wherein the expansion of the shaped probe element 12 is only partially compensated by a respective contraction of the connecting element 11. In this embodiment it is not necessary that the first sectional element, the hollow body 14, is connected with the upper rim of the connecting element 11. But the connection has to be such that a compensating expansion of the hollow body 14 along the rod axis is possible.

Figure 2:
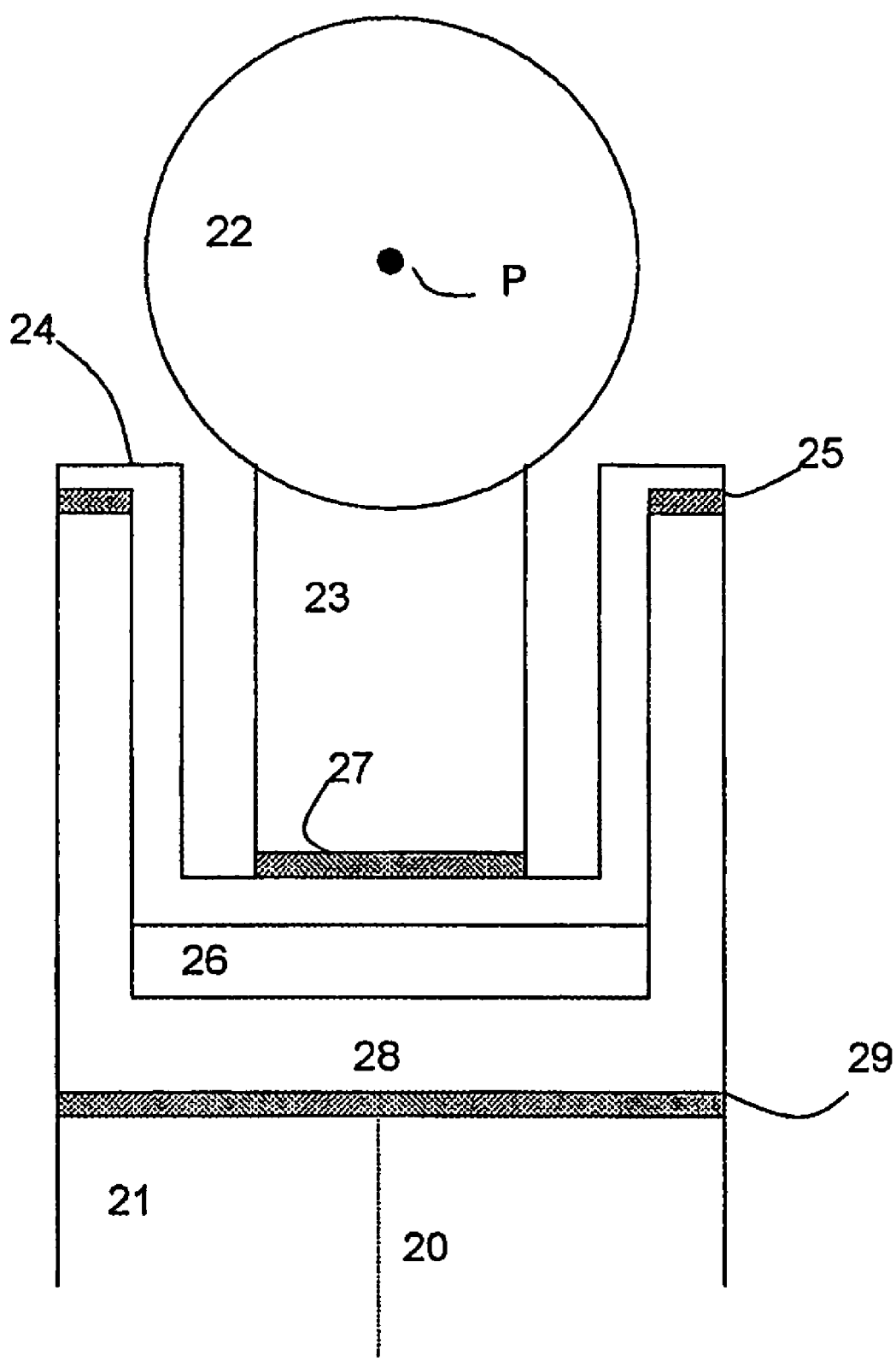
FIG. 2 shows a cross sectional view (not to scale) of a second embodiment of an inventive fastening element with a connecting element and a shaped probe element.
Figure 3:
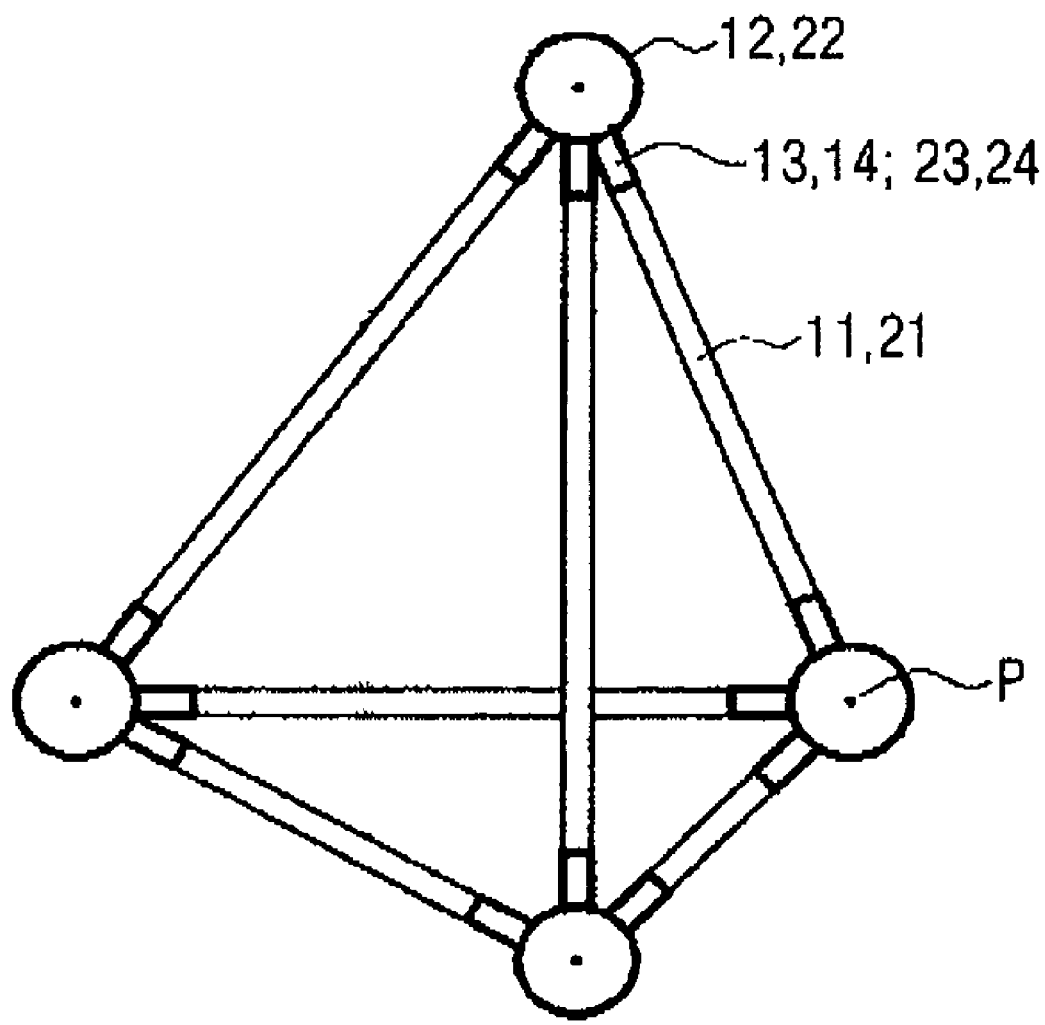
FIG. 3 shows an aspect of the invention in which the connecting elements form the edges and the shaped probe elements form the corners of a tetrahedron.

In an alternative embodiment, see FIG. 2, the fastening element is arranged on one end of the connecting element 21. In this case the fastening element comprises an outer hollow body 28, which is adhesively bonded to connecting element 21 at locations 29. To avoid tensions or disruption effects the adhesive bonding can be effected only with single adhesive points instead of an adhesive layer. Within the outer hollow body 28 is an inner hollow body 24, in which a hollow space remains between the inner and outer hollow body. Between the side walls of the two hollow bodies can also be a clearance, other than shown in the figure, so that the hollow bodies can expand unhindered also in directions perpendicular to the rod axis 20. Both hollow bodies are connected to each other via an adhesive layer at the locations 25. Alternatively the inner hollow body can also be attached to the outer hollow body in such a way that no adhesive bonding is necessary. Within the inner hollow body 24 a magnet 23 can be arranged, which in the shown embodiment is connected with the inner hollow body 24 via an adhesive layer 27. A magnetic shaped probe element 22 with sensing point P is fastened detachable to this magnet 23.

Within the scope of the described invention also modifications and various combinations of the features are possible.

The invention claimed is:

1. Test piece, comprising at least two shaped probe elements and at least one connecting element for connecting the at least two shaped probe elements, wherein each connecting element is provided with at least one fastening element at one end of the connecting element for fastening a shaped probe element, characterised in that length variations of at least one of the at least two shaped probe elements, and the at least one connecting element are compensated by the fastening elements in such a way that the distance between respective two sensing points under standard measuring conditions is essentially constant.

2. Test piece according to claim 1, in which each fastening element comprises a material with a positive or negative thermal length expansion coefficient and at least one of the form and the dimensioning of each fastening element is chosen such that length variations of at least one of each shaped probe element, and each connecting element are compensated under standard measuring conditions.

3. Test piece according to claim 1, in which each fastening element comprises a first sectional element of a first material and a second sectional element of a second material, wherein the fastening element is arranged at the connecting element and at least one of the form and the dimensioning of both sectional elements is chosen in such a way that length variations of at least one of each shaped probe element, and each connecting element are compensated under standard measuring conditions.

4. Test piece according to claim 3, in which the first sectional element is designed as a hollow body.

5. Test piece according to claim 1, in which the connecting elements are designed rod-shaped.

6. Test piece according to claim 1, in which the shaped probe elements are designed ball-shaped.

7. Test piece according to claim 1, in which the shaped probe elements and the fastening elements are detachable connectable to one another.

8. Test piece according to claim 7, in which the detachable connection is realised by magnetic forces.

9. Test piece according to claim 8, in which the fastening elements comprise magnets for the formation of the magnetic connection.

10. Test piece according to claim 1, in which at least one shaped probe element is connected with at least two connecting elements.

11. Test piece according to claim 10, in which the connecting elements form the edges and the shaped probe elements form the corners of a tetrahedron.

12. Test piece according to claim 2, in which each fastening element comprises a first sectional element of a first material and a second sectional element of a second material, wherein the fastening element is arranged at the connecting element and at least one of the form and the dimensioning of both sectional elements is chosen in such a way that length variations of at least one of each shaped probe element, and each connecting element are compensated under standard measuring conditions.

13. Test piece according to claim 12, in which the first sectional element is designed as a hollow body.

14. Test piece according to claim 2, in which the connecting elements are designed rod-shaped.

15. Test piece according to claim 2, in which the shaped probe elements are designed ball-shaped.

16. Test piece according to claim 2, in which at least one shaped probe element is connected with at least two connecting elements.

17. Test piece according to claim 3, in which the connecting elements are designed rod-shaped.

18. Test piece according to claim 3, in which the shaped probe elements are designed ball-shaped.

19. Test piece according to claim 3, in which at least one shaped probe element is connected with at least two connecting elements.

20. Test piece according to claim 4, in which at least one shaped probe element is connected with at least two connecting elements.

* * * * *